(12) United States Patent
Koo et al.

(10) Patent No.: US 12,222,688 B2
(45) Date of Patent: Feb. 11, 2025

(54) ASSISTIVE SYSTEM USING DRIVE PATTERN OF CRADLE

(71) Applicant: 1THEFULL PLATFORM LIMITED, Seoul (KR)

(72) Inventors: Seung-Yub Koo, Gyeonggi-do (KR); Seong-Taek Hwang, Gyeonggi-do (KR); Bo-Kyu Won, Gyeonggi-do (KR); Dong-Won Park, Seoul (KR); Seon-Ho Yoo, Gyeonggi-do (KR); Sin-Jong Na, Seoul (KR); Dong-Su Shin, Seoul (KR); Sung-Eon Kong, Seoul (KR)

(73) Assignee: 1THEFULL PLATFORM LIMITED, Seoul (KR)

( * ) Notice: Subject to any disclaimer, the term of this patent is extended or adjusted under 35 U.S.C. 154(b) by 509 days.

(21) Appl. No.: 17/782,297

(22) PCT Filed: Nov. 3, 2020

(86) PCT No.: PCT/KR2020/015224
§ 371 (c)(1),
(2) Date: Jun. 3, 2022

(87) PCT Pub. No.: WO2021/149897
PCT Pub. Date: Jul. 29, 2021

(65) Prior Publication Data
US 2023/0011169 A1    Jan. 12, 2023

(30) Foreign Application Priority Data

Jan. 20, 2020    (KR) .................... 10-2020-0007197

(51) Int. Cl.
*G05B 13/02*    (2006.01)
*G06F 1/16*    (2006.01)
(Continued)

(52) U.S. Cl.
CPC ....... *G05B 13/0265* (2013.01); *G06F 1/1632* (2013.01); *G06F 3/16* (2013.01); *H02J 7/0044* (2013.01)

(58) Field of Classification Search
None
See application file for complete search history.

(56) References Cited

U.S. PATENT DOCUMENTS

2016/0227361 A1* 8/2016 Booth .................... H04W 4/029
2018/0109725 A1* 4/2018 So ........................... H04N 7/142
(Continued)

FOREIGN PATENT DOCUMENTS

JP    2006-222352 A * 8/2006 ............. H04M 1/00
KR    10-2012-0070414 A    6/2012
(Continued)

OTHER PUBLICATIONS

Choe et al., A Study on Infra-Technology of Robotic Cellular Phone, Proceedings of 2004 IEEEIRSI International Conference on Intelligent Robots and Systems Sep. 28, Oct. 2, 2004.*
(Continued)

*Primary Examiner* — David J Stoltenberg
(74) *Attorney, Agent, or Firm* — The PL Law Group, PLLC

(57) ABSTRACT

An assistive system according to an embodiment of the present disclosure includes a cradle module including a holder body on which a user terminal is to be placed and a drive unit configured to drive the holder body, the cradle module configured to output a terminal connection signal
(Continued)

when the user terminal is placed on the holder body, and an assistant server configured to receive the terminal connection signal from the cradle module and execute an assistive service, the assistant server configured to control the drive unit by a preset drive pattern through a drive control signal when executing the assistive service. It is possible to easily and conveniently identify a plurality of assistive services outputted according to each situation by controlling a cradle module through a drive pattern corresponding to an assistive service while outputting a voice corresponding to the assistive service when executing the assistive service.

8 Claims, 4 Drawing Sheets

(51) Int. Cl.
*G06F 3/16* (2006.01)
*H02J 7/00* (2006.01)

(56) References Cited

U.S. PATENT DOCUMENTS

| | | | | |
|---|---|---|---|---|
| 2018/0234261 | A1* | 8/2018 | Choi | G06F 3/167 |
| 2019/0082112 | A1* | 3/2019 | Qian | H04N 23/6815 |

FOREIGN PATENT DOCUMENTS

| | | | | |
|---|---|---|---|---|
| KR | 2015-0090476 | * | 9/2014 | G06F 3/01 |
| KR | 10-2015-0065359 A | | 6/2015 | |
| KR | 10-2015-0090476 A | | 8/2015 | |
| KR | 10-2017-0038461 A | | 4/2017 | |
| KR | 10-2018-0119515 A | | 11/2018 | |
| WO | WO 2019/157633 | * | 2/2018 | G06Q 50/00 |

OTHER PUBLICATIONS

International Search Report for PCT /KR2020/015224 mailed on Feb. 8, 2021.

* cited by examiner

US 12,222,688 B2

ASSISTIVE SYSTEM USING DRIVE PATTERN OF CRADLE

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2020/015224, filed Nov. 3, 2020, which claims priority to the benefit of Korean Patent Application No. 10-2020-0007197 filed in the Korean Intellectual Property Office on Jan. 20, 2020, the entire contents of which are incorporated herein by reference.

GOVERNMENT LICENSE RIGHTS

This invention was made with Korean government support under Project No. 2022-0140 (Task Unique No. 2022-0140, Name of Institution Managing Project: Korea Association for ICT Promotion (KAIT), Research Task Name: The 2022 SW High Growth Club 200 project. (wonderfulplatform), Name of Institution Conducting Project: wonderfulplatform) awarded by Ministry of Science and ICT. The Korean government has certain rights in the invention.

BACKGROUND

1. Technical Field

The present disclosure relates to an assistive system using a drive pattern of a cradle for use of the drive pattern of the cradle as a reminder for a preset assistive service.

2. Background Art

Recently, with the growing use of smart speakers or assistive robots used as artificial intelligence (AI) secretary devices, users are conveniently using them, for example, inquiring about news, weather information and other useful information with voices, asking for music and getting the music, doing online shopping with voices, and controlling Internet of Things (IoT) domestic appliances and lightings remotely by voices.

Meanwhile, more recently, there is a dramatic increase in the number of older adults who live alone, but it is not easy for them to purchase high-cost smart speakers or assistive robots, and even though high-cost smart speakers or assistive robots are purchased, installing and using is complicated, which makes it difficult to efficiently and actively help and support older adults who live alone through the smart speakers and assistive robots.

Moreover, when assistive services are offered through only voice, older adults having hearing loss who live alone cannot efficiently use the assistive services since communication for the assistive services is not smooth.

Accordingly, it is urgent to introduce systems that ensure convenience of manipulation for older adults who have difficulties in acquiring information and can actively help and support older adults who live alone by actively identifying the internal and external risk factors of the older adults.

Additionally, there is a need for elderly care systems that help even users having hearing loss to receive service reminders easily and conveniently.

SUMMARY

The present disclosure is directed to providing an assistive system using a drive pattern of a cradle for more efficient use of assistive services by controlling a cradle module through a drive pattern corresponding to an assistive service while outputting a voice corresponding to the assistive service when executing the assistive service, to easily and conveniently identify a plurality of assistive services outputted according to each situation.

The present disclosure is further directed to providing an assistive system using a drive pattern of a cradle for providing assistive services at a low cost without any assistive robot by providing the assistive services through a user terminal and a cradle module in which the user terminal is placed and charged.

The present disclosure is directed to providing an assistive system using a drive pattern of a cradle for executing assistive services by placing the user terminal on the cradle module without any manipulation, thereby providing convenience of use.

An embodiment of the present disclosure for solving the above-described technical problem provides an assistive system using a drive pattern of a cradle including a cradle module including a holder body on which a user terminal is placed and a drive unit to drive the holder body, wherein the cradle module outputs a terminal connection signal s1 when the user terminal is placed on the holder body; and an assistant server to receive the terminal connection signal s1 from the cradle module and execute an assistive service, wherein the assistant server controls the drive unit by a preset drive pattern through a drive control signal s2 when executing the assistive service.

According to an embodiment of the present disclosure, it is possible to easily and conveniently identify a plurality of assistive services outputted according to each situation by controlling the cradle module through a drive pattern corresponding to an assistive service while outputting a voice corresponding to the assistive service when executing the assistive service.

Additionally, according to an embodiment of the present disclosure, as the assistive services are provided through the commonly used user terminal and the cradle module in which the user terminal is placed and charged, it is possible to provide the assistive services at a low cost without any assistive robot.

Additionally, according to an embodiment of the present disclosure, as the assistive services are executed by placing the user terminal on the cradle module without any manipulation, it is possible to provide convenience of use.

DETAILED DESCRIPTION

Hereinafter, some embodiments of the present disclosure will be described in detail through the exemplary drawings. It should be noted that in adding the reference signs to the elements of each drawing, like reference signs denote like elements as possible even though they are indicated on different drawings. Additionally, in describing the present disclosure, when a certain detailed description of relevant known elements or functions is determined to obscure the subject matter of the present disclosure, the detailed description is omitted.

Furthermore, in describing the elements of the present disclosure, the terms "first", "second", A, B, (a), (b), and the like may be used. These terms are only used to distinguish one element from another, and the nature of the corresponding element or its sequence or order is not limited by the term. It should be understood that when an element is referred to as being "connected", "coupled" or "linked" to another element, it can be directly connected or linked to other element, but intervening elements may be "connected", "coupled" or "linked" between each element.

Figure 1:
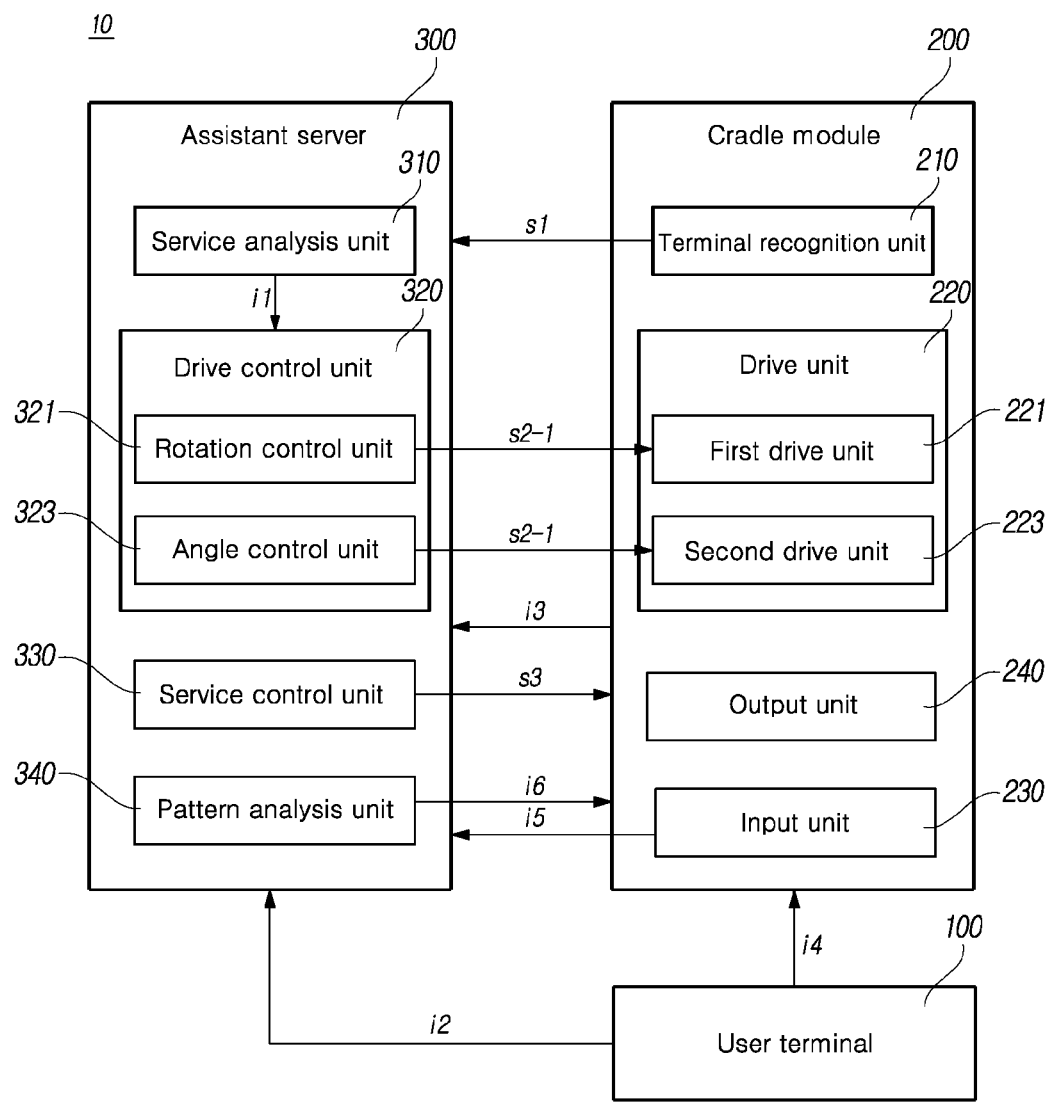
FIG. 1 is a block diagram showing the architecture of an assistive system using a drive pattern of a cradle according to an embodiment of the present disclosure.
Figure 2:
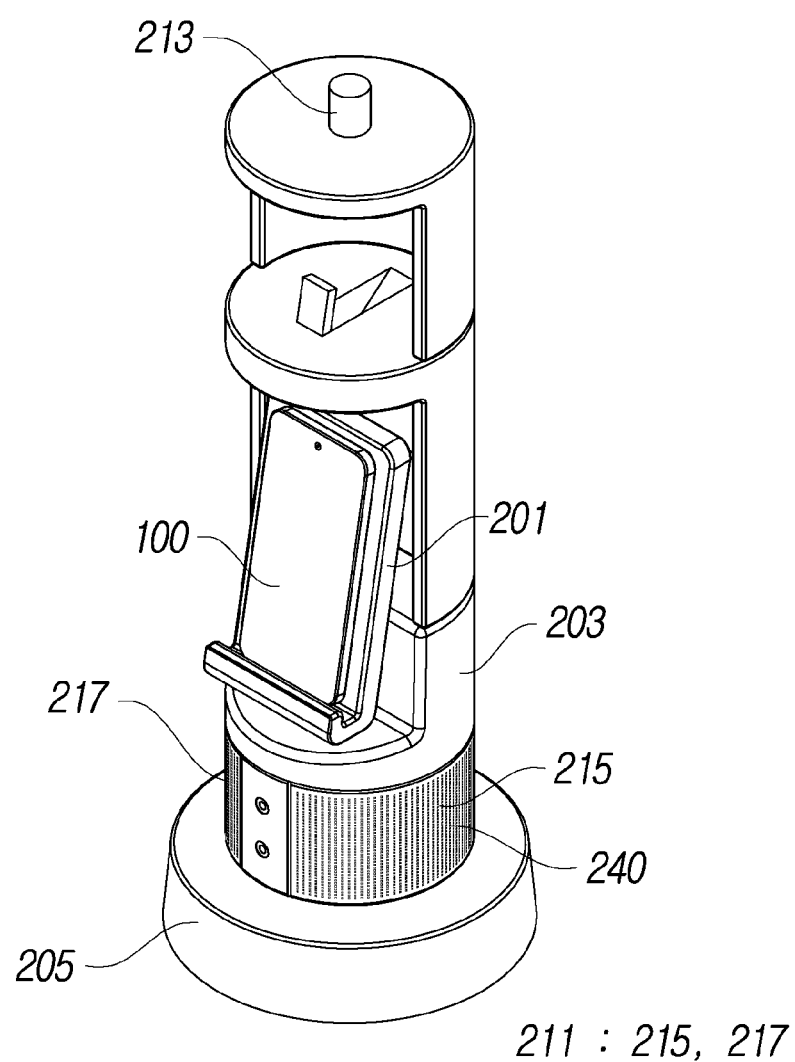
FIG. 2 is a perspective view showing a user terminal and a cradle module according to an embodiment of the present disclosure.
Figure 3:
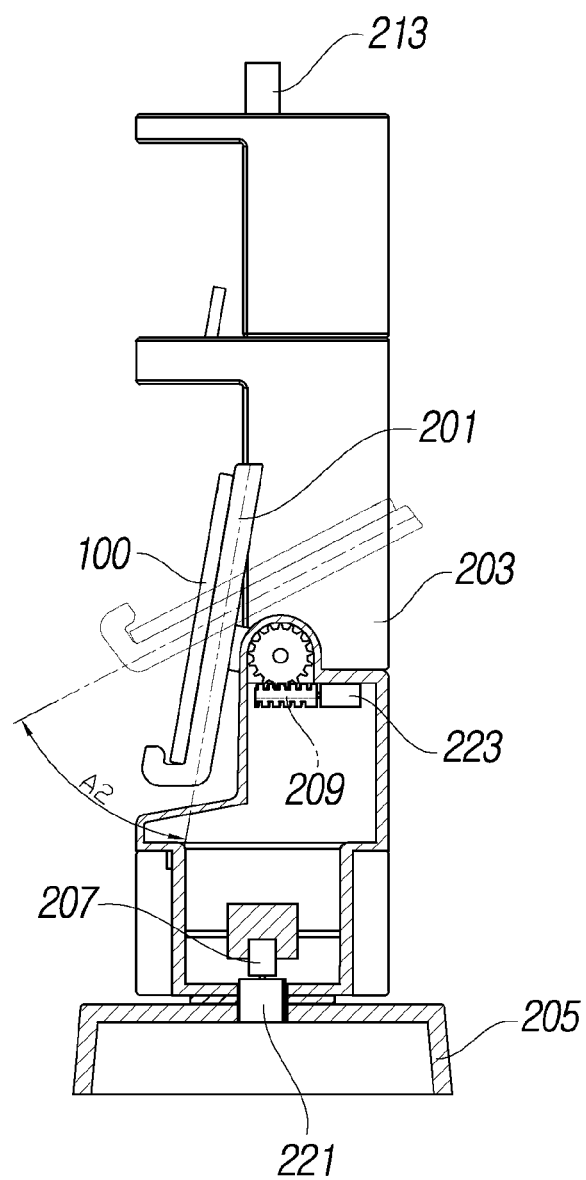
FIG. 3 is a diagram showing the internal structure of the cradle module of FIG. 2.
Figure 4:
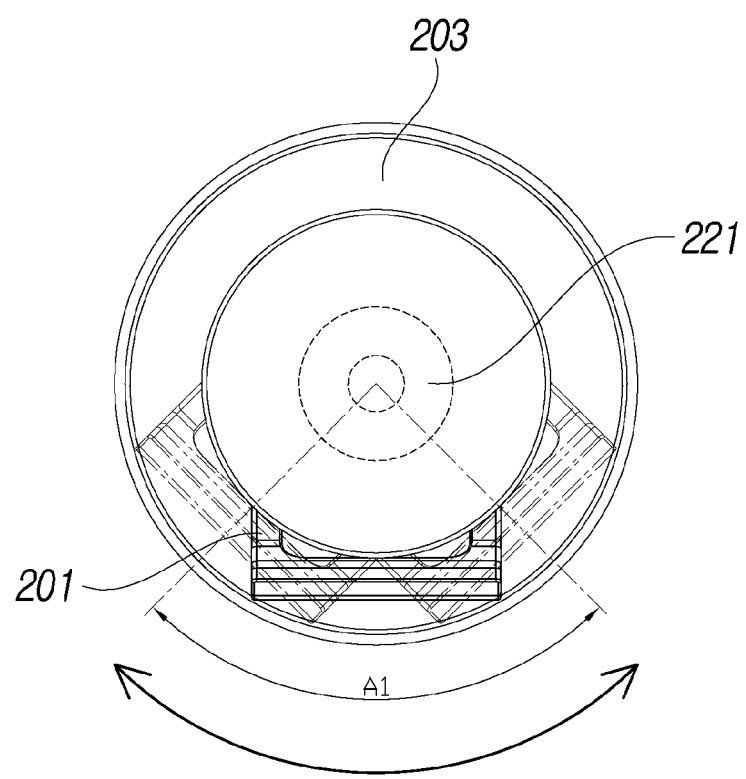
FIG. 4 is a diagram showing an example of the cradle module of FIG. 2 driven for each assistive service.

FIG. 1 is a block diagram showing the architecture of an assistive system using a drive pattern of a cradle according to an embodiment of the present disclosure. FIG. 2 is a perspective view showing a user terminal and a cradle module according to an embodiment of the present disclosure. FIG. 3 is a diagram showing the internal structure of the cradle module of FIG. 2. FIG. 4 is a diagram showing an example of the cradle module of FIG. 2 driven for each assistive service.

As shown in the drawings, the assistive system 10 using a drive pattern of a cradle according to an embodiment of the present disclosure includes a cradle module 200 including a holder body 201 on which the user terminal 100 is placed and a drive unit 220 to drive the holder body 201, wherein the cradle module 200 outputs a terminal connection signal s1 when the user terminal 100 is placed on the holder body 201; and an assistant server 300 to receive the terminal connection signal s1 from the cradle module 200 and execute an assistive service, wherein the assistant server 300 controls the drive unit 220 by a preset drive pattern through a drive control signal s2 when executing the assistive service.

Here, the assistive service according to an embodiment of the present disclosure is a service for helping and supporting a user, and may include at least one of a meal reminder service, a medication reminder service or an exercise recommendation service.

More specifically, the assistive service is a service for helping and supporting the user, for example, an older adult living alone through an artificial intelligence chatbot function, and includes services for analysis of the user's pattern provided through user information i5 including the user's voice information and image information inputted to the cradle module 200, a friendship function for inducing the user to have active conversation, video calling, medication reminders, exercise recommendations, the user's motion detection and danger notification to a caregiver terminal.

Hereinafter, each component according to an embodiment of the present disclosure will be described in detail.

First, the cradle module 200 includes the holder body 201 on which the user terminal 100 is placed, and when the user terminal 100 is placed on the holder body 201, the user terminal 100 may be wirely/wirelessly charged.

In this instance, the cradle module 200 may transmit and receive various information and signals to/from the user terminal 100 through a communication unit (not shown) capable of wired/wireless communication.

Additionally, the cradle module 200 includes the drive unit 220 to drive the holder body 201.

The drive unit 220 includes a first drive unit 221 to rotate the holder body 201 in the rotation direction of a first axis 207 formed in the heightwise direction of the holder body 201 by a first drive control signal s2-1 of the drive control signal s2.

Here, the first drive unit 221 is provided in a base unit 205 provided to rotatably support the body unit 203 under a body unit 203 having the holder body 201.

The first drive unit 221 is driven by the first drive control signal s2-1 outputted when executing the assistive service to rotate the body unit 203 having the rotatable holder body 201 in the rotation direction of the first axis 207, in order to rotate the holder body 201 and the user terminal 100 in the rotation direction of the first axis 207.

Additionally, the drive unit 220 further includes a second drive unit 223 to rotate the holder body 201 in the rotation direction of a second axis 209 formed in the widthwise direction of the holder body 201 by a second drive control signal s2-2 of the drive control signal s2.

Here, the second drive unit 223 is provided in the body unit 203 which has the holder body 201 rotatably in the vertical direction and is rotatably coupled to the upper surface of the base unit 205.

The second drive unit 223 is driven by the second drive control signal s2-2 outputted when executing the assistive service to rotate the holder body 201 in the vertical direction from the body unit 203, in order to adjust the angle of the holder body 201 and the user terminal 100 from the bottom.

Meanwhile, the cradle module 200 according to an embodiment of the present disclosure further includes a terminal recognition unit 210, an input unit 230 and an output unit 240.

First, the terminal recognition unit 210 outputs the terminal connection signal s1 and transmits it to the assistant server 300 when the user terminal 100 is placed on the holder body 201.

Here, the terminal recognition unit 210 stores terminal information i4 of the initially registered user terminal 100, and outputs the terminal connection signal s1 and transmits it to the assistant server 300 when the initially registered user terminal 100 is placed on the holder body 201 and the terminal information i4 is applied.

Here, the initially registered user terminal 100 may be the user terminal 100 of a model released and supplied by a specific communication company, or the user terminal 100 initially registered through enrollment in the assistant server 300.

That is, in an embodiment of the present disclosure, the assistive service for helping and supporting the user may be executed only when the initially registered user terminal 100 is placed on the holder body 201.

Subsequently, the input unit 230 transmits the user information i5 inputted from the user to the assistant server 300, and here, the user information i5 may include the user's voice information and image information.

That is, the input unit 230 includes a voice input unit 211 for the input of the user's voice information, and an image input unit 213 for the input of the user's image information.

Here, a plurality of voice input units 211 may be provided in the body unit 203, and for example, the voice input unit 211 includes a first voice input unit 215 provided on one side of the body unit 203 and a second voice input unit 217 provided on the other side of the body unit 203.

As the first voice input unit 215 and the second voice input unit 217 are provided on one side and the other side of the body unit 203 respectively, the decibel of the input voice information may be differently inputted depending on a direction in which the user is located, and accordingly, the assistant server 300 may detect the direction in which the user is located by comparing each voice information inputted to the first voice input unit 215 and the second voice input unit 217.

Accordingly, in an embodiment of the present disclosure, it is possible to provide the assistive service more actively by analyzing the direction in which the user is located.

Subsequently, the image input unit 213 receives the input of the user's image information, and for example, the image input unit 213 may be provided as a 360° camera for the input of the image information of the user disposed at various locations with respect to the body unit 203.

Subsequently, the output unit 240 may output the assistive service in various fashions, and the output unit 240 according to an embodiment of the present disclosure may be provided as a speaker to output various assistive services through voices, for example, a friendship function for inducing the user to have active conversation, medication reminders and exercise recommendations.

Meanwhile, the assistant server 300 according to an embodiment of the present disclosure receives the terminal connection signal s1 from the cradle module 200 and executes the above-described assistive service.

Additionally, the assistant server 300 visually outputs assistive service execution information by controlling the drive unit 220 by the preset drive pattern when executing at least one assistive service.

More specifically, when executing each of at least two assistive services, the assistant server 300 controls the drive unit 220 through different preset drive patterns corresponding to each assistive service.

Here, the drive pattern may include at least one of the number of rotations of the drive unit 220 or the rotation angle of the drive unit 220, preset according to each assistive service.

That is, the drive pattern may include at least one of the number of rotations or the rotation angle of the first drive unit 221, or the number of rotations or the rotation angle of the second drive unit 223, preset according to each assistive service.

The assistant server 310 includes a service analysis unit 310 to analyze the assistive service being executed and output assistive service information i1 when executing any one assistive service; and a drive control unit 320 to receive the assistive service information i1 and output the drive control signal s2 in response to the assistive service information i1 to control at least one of the first drive unit 221 or the second drive unit 223 through the drive pattern.

The service analysis unit 310 analyzes at least one assistive service outputted in real time, and then generates the assistive service information i1 corresponding to each assistive service and transmits it to the drive control unit 320.

That is, the service analysis unit 310 generates the assistive service information i1 corresponding to each assistive service and transmits it to the drive control unit 320 when outputting the assistive service, for example, a friendship function for inducing the user to have active conversation, video calling, medication reminders and exercise recommendations.

Subsequently, the drive control unit 320 receives the assistive service information i1 and outputs the drive control signal s2 to control the drive unit 220, in order to control the drive unit 220 by the drive pattern corresponding to each assistive service.

Describing the structure of the drive control unit 320 in more detail, the drive control unit 320 includes a rotation control unit 321 to control the first drive unit 221 by outputting the first drive control signal s2-1 in response to the assistive service information i1; and an angle control unit 323 to control the second drive unit 223 by outputting the first drive control signal s2-1 in response to the assistive service information i1.

Below is a description of various embodiments in which the drive unit 220 is driven by the preset drive pattern when executing each assistive service according to an embodiment of the present disclosure.

In an example, when a call is ringing on the user terminal 100 placed on the holder body 201, the rotation control unit 321 of the drive control unit 320 controls the first drive unit 221 by outputting the first drive control signal s2-1 in response to the assistive service information i1, and in this instance, the body unit 203 and the holder body 201 may be rotated to the left and right by a predetermined angle A1 as shown in FIG. 4.

Here, the predetermined angle A1 may be 90°.

In another example, when reminding to take a meal or medication, the service analysis unit 310 transmits the assistive service information i1 corresponding to meal or medication reminders to the drive control unit 320, and the rotation control unit 321 of the drive control unit 320 outputs the first drive control signal s2-1 in response to the assistive service information i1 and transmits it to the first drive unit 221, and in this instance, the first drive unit 221 may rotate the body unit 203 and the holder body 201 with a turn in the clockwise or counterclockwise direction.

In another example, when a call is coming from a first caregiver pre-stored in the user terminal, the angle control unit 323 outputs the second drive control signal s2-2 and transmits it to the second drive unit 221, and in this instance, the second drive unit 223 may rotate the holder body 201 up and down by a predetermined angle A2 with a single turn.

Additionally, when a call is coming from a second caregiver, the second drive unit 223 may rotate the holder body 201 up and down by the predetermined angle A2 with two turns by the second drive control signal s2-2.

In another example, when reminding to make exercise, the service analysis unit 310 transmits the assistive service information i1 corresponding to the exercise reminder to the drive control unit 320, and in this instance, the rotation control unit 321 and the angle control unit 323 control the first drive unit 221 and the second drive unit 223 by outputting the first drive control signal s2-1 and the second drive control signal s2-1, respectively, and in this instance, the first drive unit 221 and the second drive unit 223 may rotate the holder body 201 towards the first axis 207 and the second axis 209 at the same time as shown in FIGS. 3 and 4.

In this instance, in an embodiment of the present disclosure, it is possible to allow users with vision or hearing loss to identify a plurality of assistive services outputted according to each situation easily and conveniently by outputting a voice corresponding to each assistive service through the output unit 240 provided in the cradle module 200 while rotating the drive unit 220 and the holder body 201 by the drive pattern corresponding to the assistive service.

Meanwhile, the assistant server 300 according to an embodiment of the present disclosure further includes a service control unit 330 to receive location information i2, i3 from the cradle module 200 and the user terminal 100 respectively, and output a service off signal s3 to stop executing the assistive service when at least one of the location information i2, i3 is outside of a preset setting value.

That is, when there is a change in the location information i2, i3 of at least one of the cradle module 200 or the user terminal 100 for the unit time, the service control unit 330 outputs and transmits the service off signal s3 to the cradle module 200, to provide the assistive service according to each situation.

Furthermore, the assistant server 300 further includes a pattern analysis unit 340 to analyze the user's pattern through the user information i5 such as the user's voice information and image information inputted from the input unit 230.

Here, the pattern analysis unit 340 may actively analyze the user's bedtime and wakeup time through the user's image information or voice information and transmit contact information i6 to the cradle module 200 when the user wakes up, for example, a text transmitted to the user terminal 100 or a missed call on the user terminal 100 while sleeping.

In this instance, the cradle module 200 outputs the above-described contact information i6 to the user through the output unit 240, to allow the user to easily check the contact information i6 that the user missed while sleeping.

As described hereinabove, according to an embodiment of the present disclosure, it is possible to easily and conveniently identify the plurality of assistive services outputted according to each situation by controlling the cradle module 200 through the drive pattern corresponding to the assistive service while outputting the voice corresponding to the assistive service when executing the assistive service.

Additionally, according to an embodiment of the present disclosure, it is possible to provide the assistive service at a low cost without any assistive robot by providing the assistive service through the commonly used user terminal 100 and the cradle module 200 in which the user terminal 100 is placed and charged.

Additionally, according to an embodiment of the present disclosure, as the assistive service is executed by placing the user terminal 100 on the cradle module 200 without any manipulation, it is possible to provide convenience of use.

Although it has been hereinabove described that all the constituent elements in the embodiments of the present disclosure are combined into one or operate in combination, the present disclosure is not necessarily limited to such embodiments. That is, all the elements may operate in at least one selective combination within the intended scope of the present disclosure.

Additionally, unless expressly stated to the contrary, it should be interpreted that the term "comprising", "comprises", "including" or "includes" when used in this specification, specifies the presence of stated elements, but does not preclude the presence or addition of one or more other elements. Unless otherwise defined, all terms (including technical and scientific terms) used herein have the same meaning as commonly understood by those skilled in the art. It is further understood that terms, such as those defined in commonly used dictionaries, should be interpreted as having a meaning that is consistent with their meaning in the context of the relevant art document and the present disclosure, and will not be interpreted in an idealized or overly formal sense unless expressly so defined herein.

The foregoing description is made to describe the technical spirit of the present disclosure by way of illustration, and it is obvious to those skilled in the art that a variety of modifications and changes will be made without departing from the essential features of the present disclosure.

Accordingly, the embodiments disclosed herein are provided to describe, but not intended to limit, the technical spirit of the present disclosure, and the technical spirit and scope of the present disclosure is not limited by these embodiments. The scope of protection of the present disclosure should be interpreted by the appended claims, and it should be interpreted that the full technical spirit in the equivalent scope falls within the scope of protection of the present disclosure.

What is claimed is:

1. An assistive system comprising:
   a cradle module including a holder body on which a user terminal is to be placed and a drive unit configured to drive the holder body, the cradle module configured to output a terminal connection signal when the user terminal is placed on the holder body; and
   an assistant server configured to receive the terminal connection signal from the cradle module and execute an assistive service, the assistant server configured to control the drive unit by a preset drive pattern through a drive control signal when executing the assistive service.

2. The assistive system of claim 1, wherein the assistive service includes at least one of a meal reminder service, a medication reminder service or an exercise recommendation service.

3. The assistive system of claim 1, wherein the assistant server is configured to control the drive unit through different preset drive patterns corresponding to each assistive service when executing each of at least two assistive services.

4. The assistive system of claim 3, wherein the drive pattern includes at least one of a number of rotations of the drive unit or a rotation angle of the drive unit, preset according to each assistive service.

5. The assistive system of claim 1, wherein the drive unit includes:
   a first drive unit configured to rotate the holder body in a rotation direction of a first axis formed in a heightwise direction of the holder body by a first drive control signal of the drive control signal.

6. The assistive system of claim 5, wherein the drive unit includes:
   a second drive unit configured to rotate the holder body in a rotation direction of a second axis formed in a widthwise direction of the holder body by a second drive control signal of the drive control signal.

7. The assistive system of claim 6, wherein the assistant server includes:
   a service analysis unit configured to analyze the assistive service being executed and output assistive service information when executing any one assistive service; and
   a drive control unit configured to receive the assistive service information and output the drive control signal in response to the assistive service information to control at least one of the first drive unit or the second drive unit through the drive pattern.

8. The assistive system of claim 1, wherein the assistant server further includes:
   a service control unit configured to receive location information from the cradle module and the user terminal, respectively, and output a service off signal to stop executing the assistive service when at least one of the location information is outside of a preset setting value.

* * * * *